US009798400B2

United States Patent
Urakawa

(10) Patent No.: US 9,798,400 B2
(45) Date of Patent: Oct. 24, 2017

(54) DISPLAYING DEVICE AND NON-TRANSITORY COMPUTER-READABLE RECORDING MEDIUM STORING INSTRUCTIONS

(71) Applicant: Brother Kogyo Kabushiki Kaisha, Nagoya (JP)

(72) Inventor: Yutaka Urakawa, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 287 days.

(21) Appl. No.: 14/552,657

(22) Filed: Nov. 25, 2014

(65) Prior Publication Data
US 2015/0169151 A1 Jun. 18, 2015

(30) Foreign Application Priority Data
Dec. 13, 2013 (JP) ................................. 2013-258346

(51) Int. Cl.
*G06F 3/048* (2013.01)
*G06F 3/041* (2006.01)
(Continued)

(52) U.S. Cl.
CPC ............ *G06F 3/041* (2013.01); *G06F 3/0485* (2013.01); *G06F 3/04883* (2013.01)

(58) Field of Classification Search
CPC .... G06F 3/04883; G06F 3/0485; G06F 3/041; G06F 3/0488
See application file for complete search history.

(56) References Cited

U.S. PATENT DOCUMENTS 7,748,634 B1 *  7/2010  Zehr ..................... G06F 1/1626
                                                     235/375
2009/0244020 A1 * 10/2009 Sjolin ................. G06F 3/04883
                                                     345/173
(Continued)

FOREIGN PATENT DOCUMENTS

JP    H08-076926      3/1996
JP    2010-107688 A   5/2010
(Continued)

OTHER PUBLICATIONS

Japanese Office Action (With English Translation), Japanese Application No. 2013-258346, dated Jul. 11, 2017 (8 pages).

*Primary Examiner* — Aaron Lowenberger
*Assistant Examiner* — Asteway T Gattew
(74) *Attorney, Agent, or Firm* — Burr & Brown, PLLC

(57) ABSTRACT

A displaying device is configure to obtain a moving direction and a moving amount of the input element from a touch panel, scroll a currently displayed page in a direction same as the moving direction of the input element such that the currently displayed page is switched to a target page. When the moving amount of the input element is less than a predetermined threshold amount, the target page is set to be a next page which is next to the currently displayed page on a side opposite to the moving direction of the input element, while, when the moving amount of the input element is not less than the predetermined threshold amount, the target page is set to be a page further advanced from the next page on a side opposite to the moving direction of the input element.

18 Claims, 10 Drawing Sheets

(51) Int. Cl.
    *G06F 3/0485*     (2013.01)
    *G06F 3/0488*     (2013.01)

(56) References Cited

U.S. PATENT DOCUMENTS

| | | | |
|---|---|---|---|
| 2009/0267909 A1* | 10/2009 | Chen | G06F 3/04883 345/173 |
| 2011/0169764 A1* | 7/2011 | Miyoshi | G06F 3/0483 345/173 |
| 2012/0206388 A1* | 8/2012 | Tsuboi | G06F 3/0482 345/173 |
| 2013/0076758 A1* | 3/2013 | Li | G06T 13/00 345/473 |
| 2013/0169563 A1 | 7/2013 | Sotoike | |
| 2013/0232439 A1* | 9/2013 | Lee | G06F 3/0488 715/776 |
| 2014/0331146 A1* | 11/2014 | Ronkainen | G06F 3/0482 715/741 |
| 2014/0380247 A1* | 12/2014 | Tecarro | G06F 3/04883 715/863 |

FOREIGN PATENT DOCUMENTS

| | | |
|---|---|---|
| JP | 2011-022745 A | 2/2011 |
| JP | 2013-137614 A | 7/2013 |

* cited by examiner

DISPLAYING DEVICE AND NON-TRANSITORY COMPUTER-READABLE RECORDING MEDIUM STORING INSTRUCTIONS

CROSS-REFERENCE TO RELATED APPLICATION

This application claims priority under 35 U.S.C. §119 from Japanese Pat. App. No. 2013-258346 filed on Dec. 13, 2013. The entire subject matter of the application is incorporated herein by reference.

BACKGROUND

Technical Field

The present disclosures relate to a displaying device and a non-transitory computer-readable medium for the displaying device. Specifically, the present disclosures relate to a displaying device configured to display a plurality of pages of images which are scrolled on a page basis, and a computer-readable medium storing instructions causing a processor of the displaying device to display the screen which is scrolled on a page basis.

Related Art

Conventionally, there has been known a displaying device configured to display a plurality of pages of images which are scrolled on a page basis. For example, in a mobile terminal such as a smartphone, a plurality of icons representing respective application programs are distributed on a plurality of pages. When a user drags or flicks the screen, the pages are scrolled, and a plurality of pages are switched one by one in accordance with a direction in which the user drags or flicks the screen.

Specifically, in such a conventional displaying device, a touch panel is provided on the screen to detect a moving direction of a user's finger, and the currently displayed page is switched to a preceding/succeeding page based on the moving direction of the user's finger. There is also provided a displaying device in which the number of scrolled pages is determined based on the number of fingers simultaneously touching the touch panel.

SUMMARY

In such a conventional displaying device, the screen is switched on a page basis, and the number of scrolled pages is determined based on the moving direction of the finger and/or the number of the fingers touching the touch panel, the screen is switched. However, any other methods of switching a plurality of pages are not considered, and an improvement has been desired.

According to aspects of the disclosures, there is provided a displaying device, which is provided with a displaying unit, a touch panel provided on the displaying unit and configured to detect a touch by an input element, and a controller. The controller may be configured to control the displaying device to display one of a plurality of pages of images on the display unit, obtain a moving direction and a moving amount of the input element from a touch point to a release point, the touch point being a point at which a non-touched state where the touch panel does not detect touch of the input element is changed to a touched state where the touch panel detects touch of the input element, the release point being a point at which the touched state is changed to the non-touched state, and scroll a currently displayed page in a direction same as the moving direction of the input element such that the currently displayed page is switched to a target page. When the moving amount of the input element is less than a predetermined threshold amount, the target page may be set to be a next page which is next to the currently displayed page on a side opposite to the moving direction of the input element, and when the moving amount of the input element is equal to or larger than the predetermined threshold amount, the target page may be set to be a page further advanced from the next page on a side opposite to the moving direction of the input element.

According to other aspects of the disclosures, there is provided a non-transitory computer-readable recording medium storing instructions for a displaying device which has a displaying unit, a touch panel provided on the displaying unit and configured to detect a touch by an input element, and a controller. The instructions may cause, when executed by the controller, the displaying device to, display one of a plurality of pages of images on the display unit, obtain a moving direction and a moving amount of the input element from a touch point to a release point, the touch point being a point at which a non-touched state where the touch panel does not detect touch of the input element is changed to a touched state where the touch panel detects touch of the input element, the release point being a point at which the touched state is changed to the non-touched state, and scroll a currently displayed page in a direction same as the moving direction of the input element such that the currently displayed page is switched to a target page. When the moving amount of the input element is less than a predetermined threshold amount, the target page may be set to be a next page which is next to the currently displayed page on a side opposite to the moving direction of the input element, and when the moving amount of the input element is equal to or larger than the predetermined threshold amount, the target page may be set to be a page advanced from the next page on a side opposite to the moving direction of the input element.

BRIEF DESCRIPTION OF THE ACCOMPANYING DRAWINGS

DETAILED DESCRIPTION OF THE ILLUSTRATIVE EMBODIMENT

Figure 1:
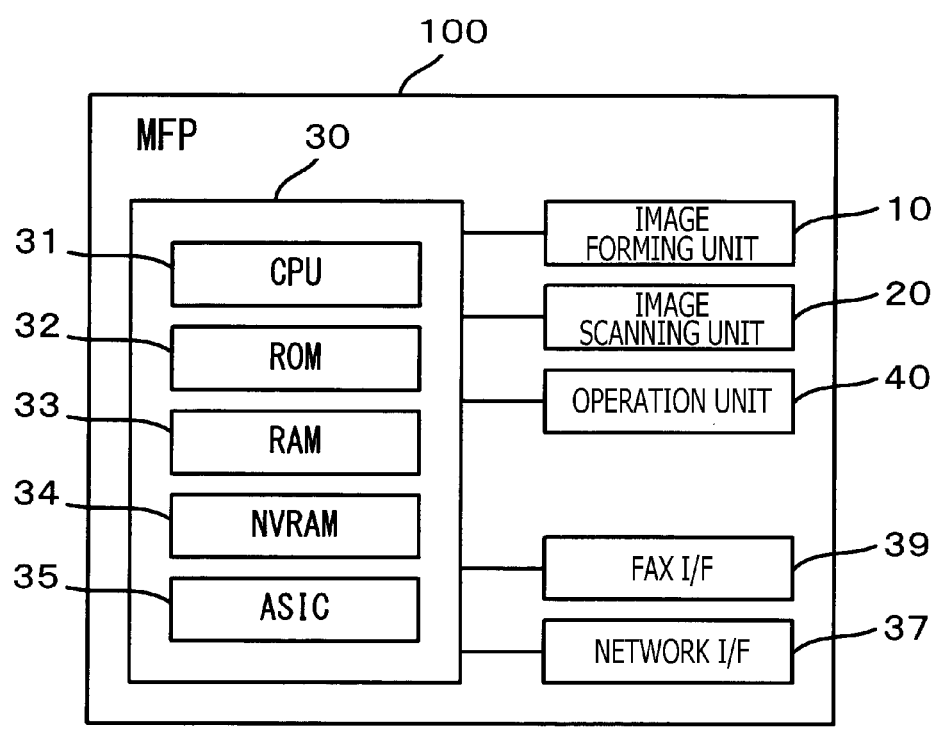
FIG. 1 is a block diagram showing an electrical configuration of an MFP (multifunction peripheral) according to an illustrative embodiment of the disclosure.

Hereinafter, a displaying device of an illustrative embodiment according to aspects of the disclosure will be described, referring to the accompanying drawings. Specifically, an MFP (multi-function peripheral) which has a plurality of functions concerning image processing, and an operation unit which serves as an I/O (input/output) interface will be described in detail.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, permanent storages, and the like.

According to an illustrative embodiment, an MFP 100 has a controller 30 provided with a CPU (central processing unit) 31, a ROM (random access memory) 32, a RAM (read only memory) 33, an NVRAM (non-volatile RAM) 34 and an ASIC (application specific integrated circuit) 35. The MFP 100 is also provided with an image forming unit 10, an image reading unit 20, an operation unit 40, and a FAX (facsimile) interface 39 and a network interface 37 which serve as communication interfaces to connect the MFP 100 with an external device. The image forming unit 10, the image reading unit 20, the operation unit 40, the FAX interface 39 and the network interface 37 are controlled by the CPU 31. It is noted that the controller 30 is a general term including the hardware components such as the CPU 31, which are used in controlling the MFP 100 and needs not be limited to a single hardware device.

The ROM 32 stores firmware which is a control program to control the MFP 100, various settings, initial values and the like. The RAM 33 is used as a work area in which various control programs are temporarily stored and/or a storage area temporarily stores image data.

The CPU 31 controls the various components of the MFP 100 in accordance with control programs retrieved from the ROM 32 and various signals output from various sensors, with storing processing results of the same in the RAM 33 and/or NVRAM 34.

The FAX interface 39 and the network interface 37 are hardware which enables a communication with other devices. For example, the MFP 100 is capable of transmitting image data read with the image reading unit 20 to external devices through the above interfaces. It is also possible that the MFP 100 receives image data subject to be printed by the image forming unit 10 from external devices through the above interfaces.

Figure 2:
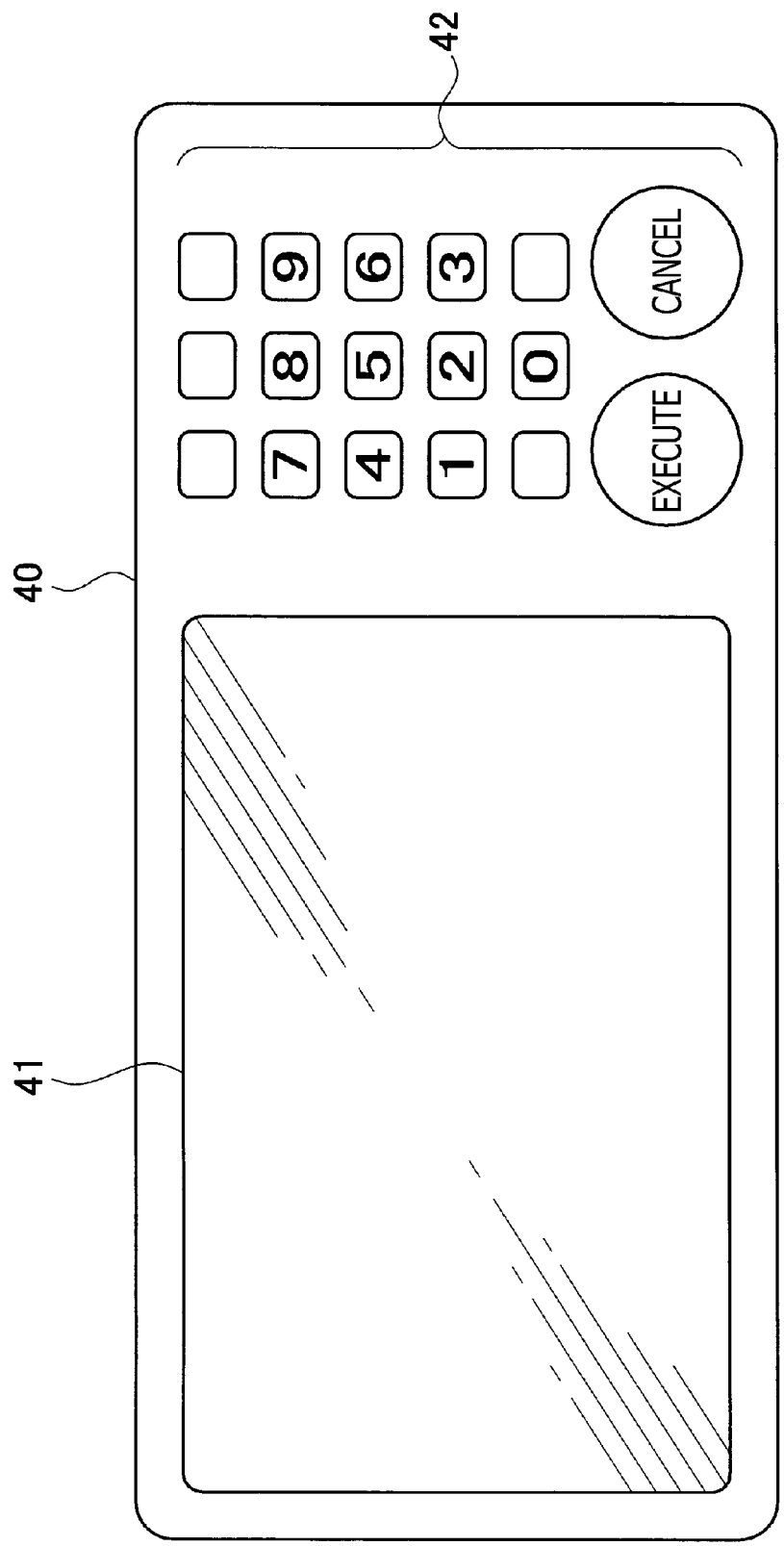
FIG. 2 shows a configuration of an operation unit of the MFP according to the illustrative embodiment.

The operation unit 40 is arranged on an outer surface of the MFP 100. As shown in FIG. 2, the operation unit 40 is provide with various buttons 42 to be operated by a user, and a touch panel 41 which displays messages and setting values. It is noted that the buttons 42 include an execution button with which the user can input a command to start an image processing and a cancel button with which the user can input a command to cancellation of the image processing. It is also noted that by touching the touch panel 41 with a finger, the user can input various inputs.

The MFP 100 has a screen to be displayed on the touch panel 41. The screen has a plurality of pages, which are sequentially advanced in accordance with the user operations such as the user's operations of touching, dragging flicking and the like with respect to the touch panel 41.

Figure 3:
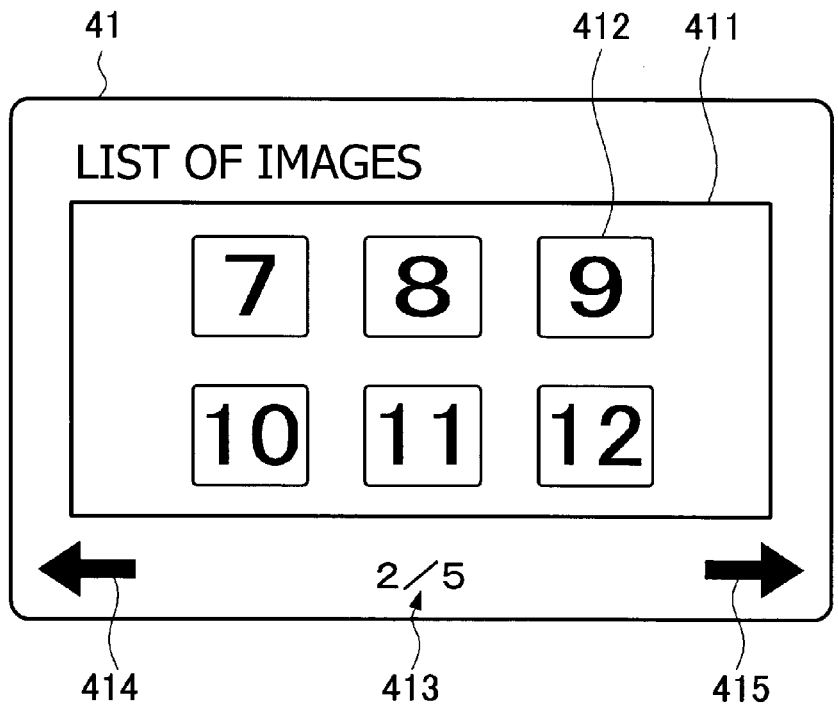
FIG. 3 shows an exemplary display of a touch panel of the MFP according to the illustrative embodiment.

For example, the MFP 100 has a function of displaying image files which would become candidates subject to be printed as a list of the images. When a user's instruction to display a list of the image files, the MFP 100 displays an image list screen, which has a list display area 411, on the touch panel 41 as shown in FIG. 3. On the image list screen, thumbnail images 412 are displayed. According to the illustrative embodiment, six (which is the maximum number for one page of the screen) thumbnail images are displayed. In such a state, when the user touches one of the thumbnail images 412 currently displayed, the touched thumbnail image 412 is in a selected state. When depression of the execution button is detected, the MFP 100 prints out the image file which is in the selected state.

When the number of the image files exceeds six, the image list screen is divided into two or more pages which can be switched and displayed on a page basis. When there are a plurality of pages, a page number display area 413, and arrow buttons 414 and 415 for switching pages are displayed. When a touch of the arrow button 414 or 415 is detected, the MFP 100 switches the displayed page, and updates the page number display area 413. The MFP 100 also switches the pages when the user operation of dragging or flicking on the touch panel 41 is detected. It is noted that the dragging and flicking may be detected at any position on the touch panel 41.

Figure 4:
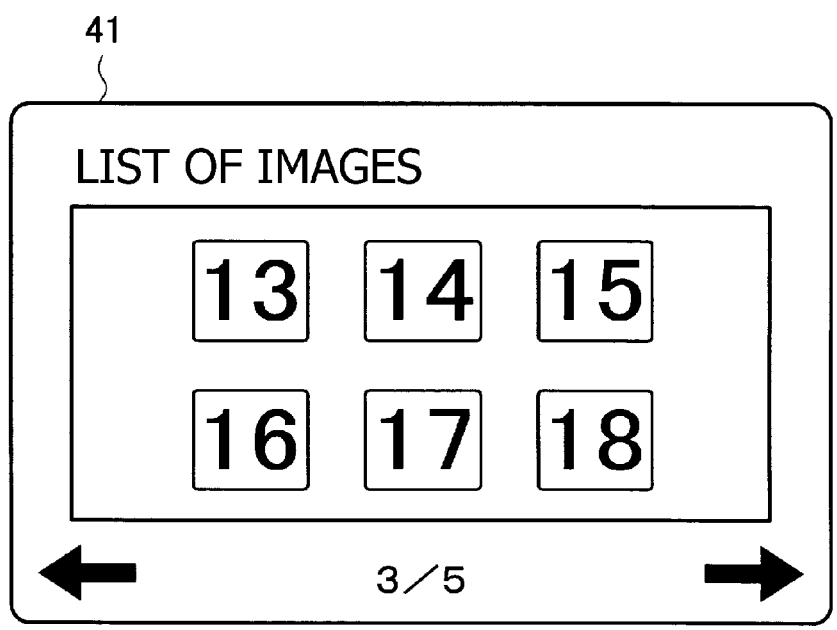
FIG. 4 is an exemplary display of the touch panel after the screen is flicked.

On the image list screen, when the user performs to touch on the arrow button 414, or drag/flick from right to left on the touch panel 41, a page subsequent to the currently displayed page will be displayed. When the user touches on the arrow button 415, or drags/flicks the touch panel 41 from left to right, a page before the currently displayed page will be displayed. That is, when there are multiple pages, the pages can be scrolled in the right-and-left direction on the image list screen. For example, when a second page of total of five pages is being displayed as shown in FIG. 3, and a user operation to move to the subsequent page is detected, the third page will be displayed as shown in FIG. 4. According to the illustrative embodiment, the pages cannot be scrolled in the up-and-down direction.

As described above, the MFP 100 displays the image list screen on page basis. That is, the MFP 100 allowing the user to scroll the pages of the image list screen one by one. Specifically, when the user has finished dragging or flicking on the touch panel 41, the next page (i.e., the preceding page or the subsequent page) will be displayed. In other words, when the user has finished dragging/flicking, only the next page (i.e., the preceding page or the subsequent page) is displayed, and the displayed image will not include part of two subsequent pages and the boundary therebetween when the image list screen is not being scrolled. Further, the displayed image will not be a part of an image which is larger than the display area of the touch panel 41, or allow the image to be scrolled to show the other part of the larger image.

When the pages are switched by dragging or flicking, the MFP 100 changes the amount of advanced or returned pages depending on a moving amount of the input element (e.g., the user's finger) on the touch panel 41, or a moving speed of the input element on the touch panel 41. That is, the more the moving amount is, and the more the moving speed is, the number of the pages to be advanced or returned (i.e., skipped) is increased.

The MFP 100 is configured such that a scroll between the first page and the last page is enabled. That is, a scroll directly from the first page to the last page, and a scroll directly from the last page to the first page are enabled. In the following description, image drawing on the display when the scroll between the first and the last pages are performed will be referred to as a "cyclic drawing." Whether the cyclic drawing is enabled or not may be set for each screen. For example, in the image list screen described above, the cyclic drawing is enabled.

Next, processes to be executed when a contact status of the touch panel 41 by the input element is detected will be described. Description will be made for three events: a touch event; a drag event; and a release event. It is noted that the input element may be a user's finger, or an input device such as a stylus pen. According to the illustrative embodiment, the MFP 100 periodically (for example, at every 50 msec.) detects the contact status on the touch panel 41.

Figure 5:
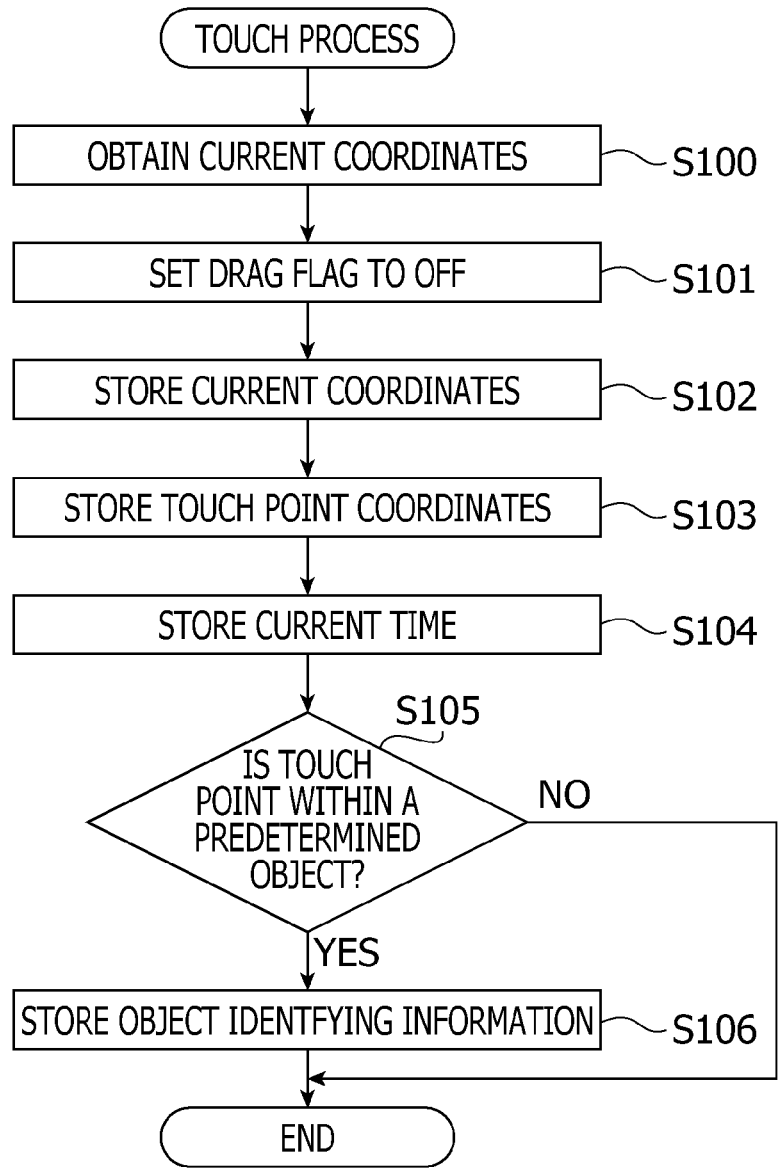
FIG. 5 is a flowchart illustrating a touch process executed by the MFP according to the illustrative embodiment.

Firstly, the touch process which is launched when a touch on the touch panel 41 is detected, referring to a flowchart shown in FIG. 5. When a status of the touch panel 41 is changed from a status in which an input element does not touch the touch panel 41 to a status in which an input element has touched the touch panel 41, it is determined that the touch event has occurred. The touch process is executed by the CPU 31.

In the touch process, the CPU 31 obtains coordinates on the touch panel 41 at a position where the touch of the input element is detected (S100). Then, in S101, the CPU 31 sets the drag flag to be an OFF state. The drag flag is referred to in the drag process and the release process, which will be described later. Further, the CPU 31 stores the coordinates of the current touch point obtained in S100 as previous process coordinates (S102). The CPU 31 also stores the current touching position obtained in S100 as touch point coordinates (S103). Further, the CPU 31 stores the current time as a previous process time (S104). It is noted that the execution order of S100 and S101 may be reversed, or executed simultaneously. Further, the execution order of S101, S102, S103 and S104 may be changed arbitrarily or they may be executed simultaneously.

Thereafter, the CPU 31 determines whether the touch point represented by the coordinates is within a predetermined object such as a thumbnail image, a button or the like (S105). When the coordinates of the touch point represent a position within one of predetermined objects (S105: YES), information identifying the object including the touch point is stored (S106). After execution of S106, or when the touch point is not included in any one of the predetermined objects (S105: NO), the touch process is terminated.

Figure 6:
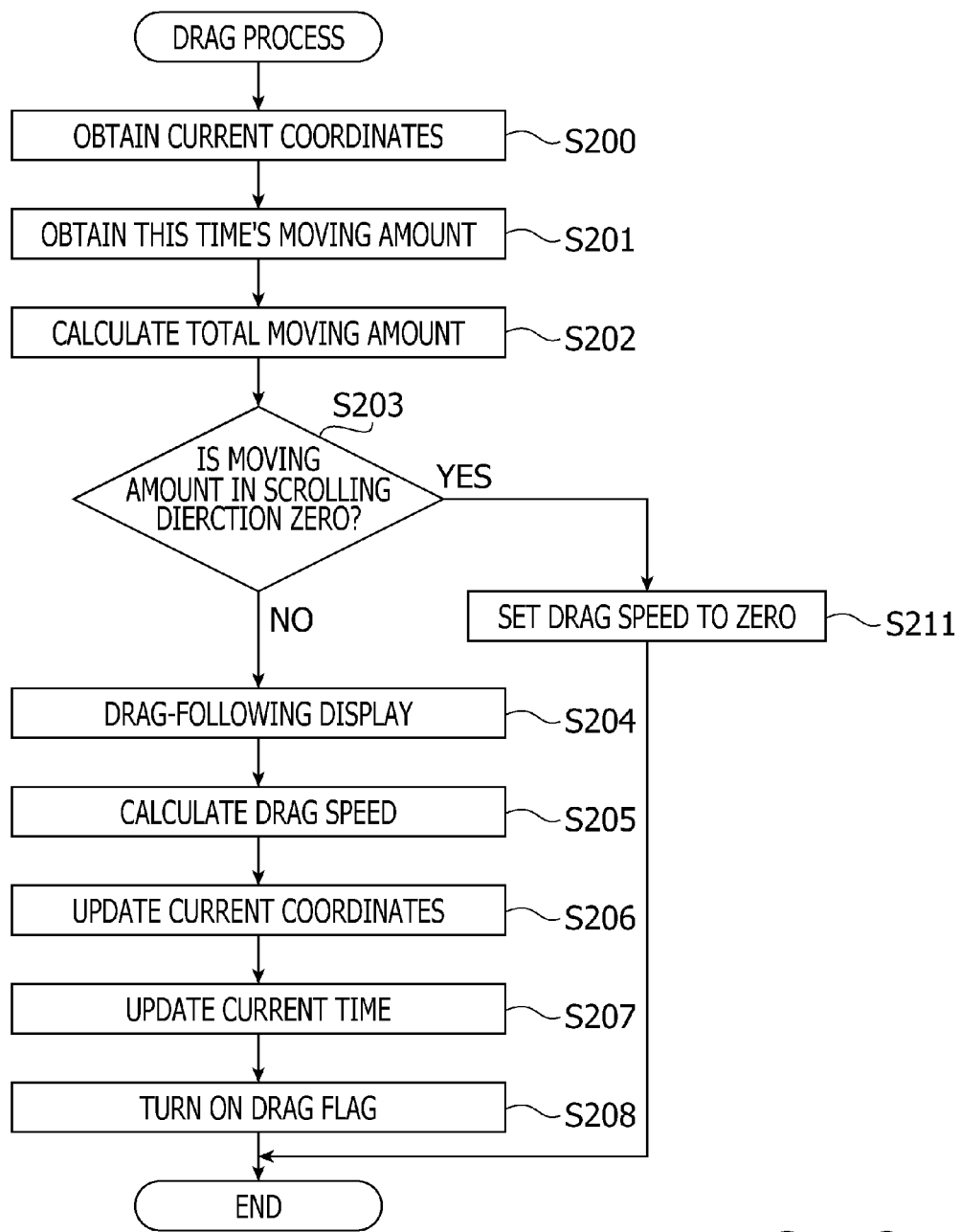
FIG. 6 is a flowchart illustrating a drag process executed by the MFP according to the illustrative embodiment.

Next, the drag process which is launched when the MFP 100 detects a drag event on the touch panel 41, referring to the flowchart shown in FIG. 6. The drag event is detected when the touch state is continued after the input element has touched the touch panel 41 and the touching position is moved with the touch state is maintained. The drag process is also executed by the CPU 31.

When the drag process is started, the CPU 31 obtains the coordinates of the current touching position (S200). Next, the CPU 31 retrieves the previous process coordinates, and calculates a moving amount at this calculation based on the previous process coordinates and the current touch coordinates (S201). Further, the CPU 31 retrieves the coordinates of the touch point (i.e., a point at which the input element firstly touches at the beginning of a dragging movement), and calculates total moving amount based on the current coordinates and the coordinates of the touch point (S202). In S201 and S202, the CPU 31 calculates the moving amounts in orthogonal directions (i.e., along an axis of ordinate and an axis of abscissa of the coordinate), respectively. The calculated amounts contain signs representing moving directions with respect to the axes of coordinates.

After execution of S202, the CPU 31 determines whether the moving amount in a direction parallel to the scrolling direction, in which the thumbnail images are scrollable, is zero or not (S203). In an example shown in FIG. 3, the thumbnail images are scrollable along the axis of ordinate, and are not scrollable along the axis of abscissa. Therefore, in this case, the CPU 31 determines whether the moving amount along the axis of the abscissa is zero or not.

Figure 7:
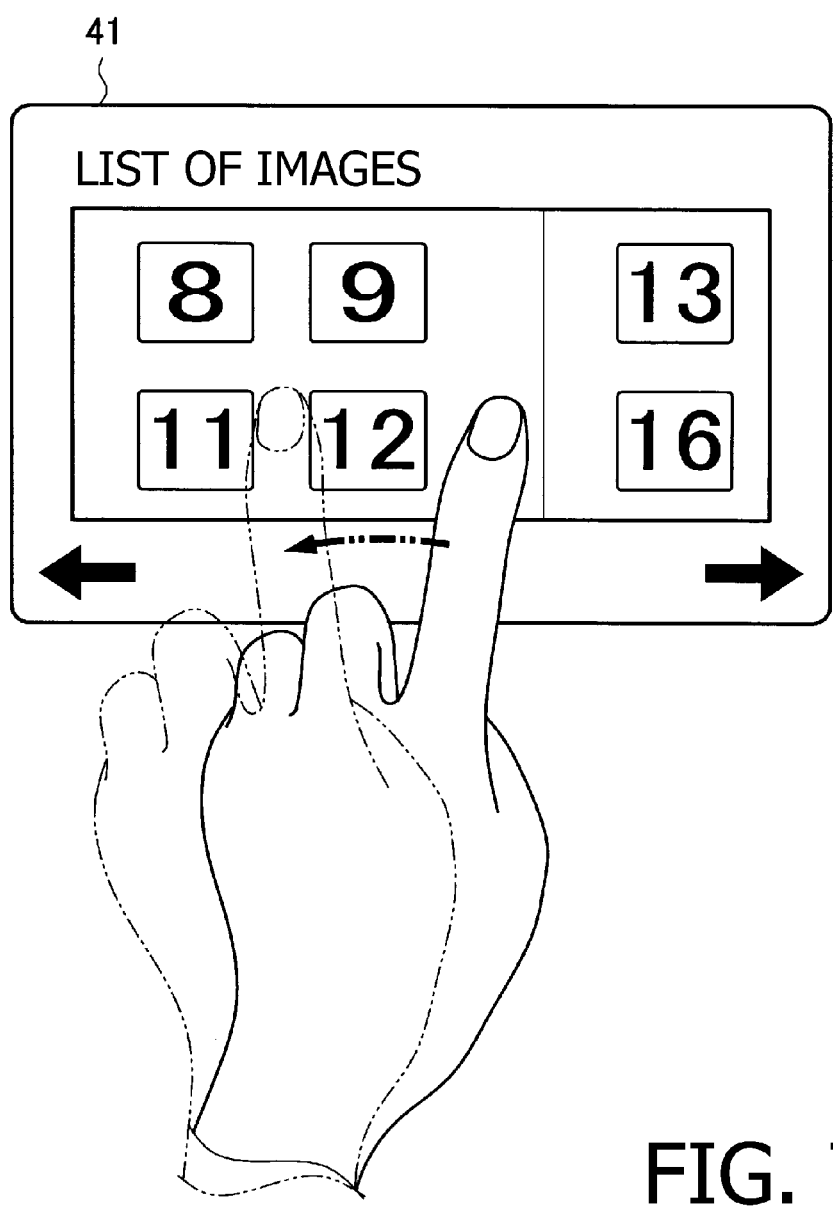
FIG. 7 is an exemplary display when the screen is being dragged.

When the moving amount is not zero (S203: NO), the CPU 31 controls the pages of the screen to scroll in accordance with the moving amount so that the scrolling follows the dragging movement as shown in FIG. 7 (S204). Further, the CPU 31 retrieves the time of the previously executed process, and calculates a dragging speed which is a moving speed of the touching position based on a difference between the time of the previously executed process and the current time and the moving amount at this time, and stores the calculated dragging speed (S205). It is noted that, in S205, the dragging speeds in the orthogonal directions (i.e., along an axis of ordinate and an axis of abscissa of the coordinate), respectively. The dragging speeds contain signs representing the moving directions, respectively. Further, the CPU 31 stores the coordinates of the current touching position as previous process coordinates (S206) and the current time as the previous process time (S207). Further, the CPU 31 sets the drag flag to be ON (S208) which represent that a dragging movement has been detected. It is noted that the order of executions of S205, S206, S207 and S208 may be changed arbitrarily or they may be executed simultaneously.

When the moving amount is zero (S203: YES), it is unnecessary to update the display. Therefore, the CPU 31 simply stores zero as the drag speed (S211). After execution of S211 or S208, the drag process is terminated.

Figure 8:
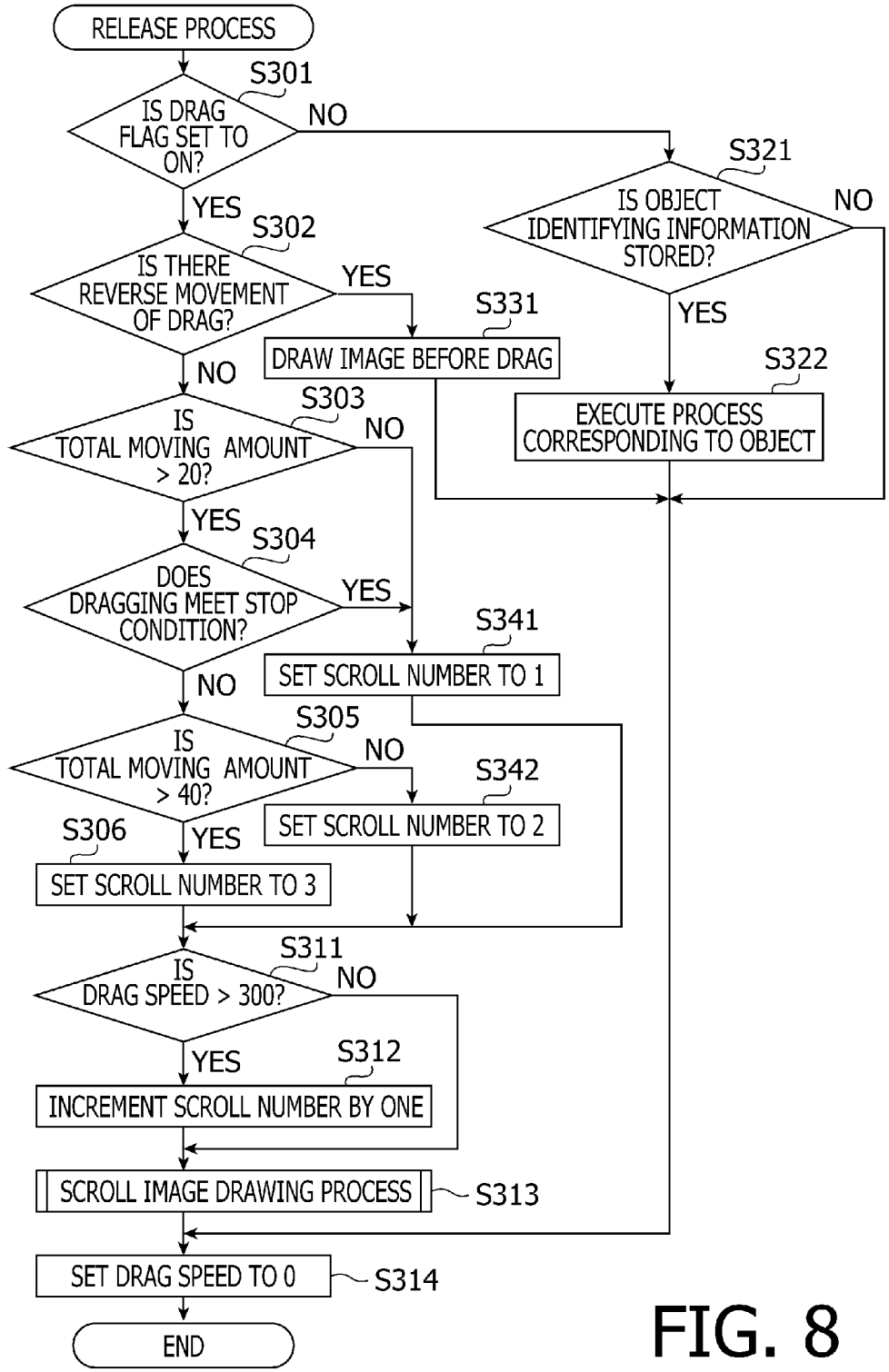
FIG. 8 is a flowchart illustrating a release process executed by the MFP according to the illustrative embodiment.

Next, the release process, which is launched when the MFP 100 detects the release event, will be described, referring to the flowchart shown in FIG. 8. The release event is detected when the input element is released from the touch panel 41, that is, when the touching state of the input element has changed to a non-touching state. The release process is executed by the CPU 31.

When the release process is started, the CPU 31 determines whether the drag flag is ON (S301). When the drag flag is not ON (S301: NO), the CPU 31 determines that the input element is released without being dragged, that is, the input element only touched the touch panel 41.

Then, the CPU 31 determines whether the information identifying the object is stored (S321). It is noted that the information identifying the object is stored in S106 of the touch process. When the information identifying the object is stored (S321: YES), the CPU 31 executes a process corresponding to the object (S322). For example, when a thumbnail image is stored as information identifying the object, the CPU 31 sets the thumbnail image to be a selected state. When the arrow button 414 is stored as the information identifying the object, the CPU 31 switches the page of the screen to the previous page. After execution of S322 or when the information identifying the object is not stored (S321: NO), the CPU 31 stores zero as the drag speed (S314), and the release process is terminated.

When the drag flag is ON (S301: YES), the CPU 31 determines that the input element is released after being dragged. In this case, the CPU 31 determines whether a backward movement of the drag, which is a reverse movement of the dragging, has been made (S302). According to the illustrative embodiment, the CPU 31 determines that there is a backward movement of the dragging when the sign of the total moving amount and the sign of the dragging speed are different. That is, even if the total moving amount is a considerable amount, when there is a backward movement of the dragging operation before the input element is released, it is very likely that the user has hesitated to switch the pages.

When the backward movement of dragging has not been occurred (S302: NO), the CPU 31 determines a scroll number, which represent the number of pages to be scrolled. According to the illustrative embodiment, the CPU 31 determines whether the total moving amount exceeds 20 dots (S303). When the total moving amount is equal to or less than 20 dots (S303: NO), the CPU 31 determines that the scroll number is one (S341).

When the total moving amount is greater than 20 dots (S303: YES), the CPU 31 determines whether a stop condition of the dragging is satisfied (S304). For example, when the dragging speed is less than 3 dots/sec., the CPU 31 determines that the stop condition is satisfied. It is noted that, when the dragging speed is zero or close to zero, that is, the input element is substantially unmoved, it is very likely that the user hesitate to scroll a plurality of pages even if the total moving amount is relatively large. Therefore, in such a case, that is, when the stop condition of the dragging is satisfied (S304: YES), the CPU 31 sets the scroll number to one (S341).

When the stop condition is not satisfied (S304: NO), it is likely that the use wishes to scroll a plurality of pages. Therefore, the CPU 31 determines the number of pages to be scrolled in accordance with the moving amount of the input element. According to the illustrative embodiment, the CPU 31 next determines whether the total moving amount is greater than 40 dots or not (S305). When the total moving amount is equal to or less than 40 dots (S305: NO), the CPU 31 determines that the scroll number is two (S342). When the total moving amount is greater than 40 (S305: YES), the CPU 31 determines that the scroll number is three (S306).

After execution of S306, S341 or S342, the CPU 31 determines whether the dragging speed is faster than 300 dots/sec. or not (S311). When the dragging speed is faster, it is likely that the user wishes to scroll the larger number of pages. Therefore, according to the illustrative embodiment, when the dragging speed is faster than 300 dots/sec. (S311: YES), the CPU 31 increments the scroll number determined in S306, S341 or S342 by one (S312).

After execution of S312, or when the CPU 31 has determined that the dragging speed is equal to or slower than 300 dots/sec. (S307: NO), the CPU 31 executes a scroll image drawing process (S313) in which the displayed pages are switched.

After execution of S314, the CPU 31 sets the drag speed to zero (S314) and the release process is terminated.

Figure 9:
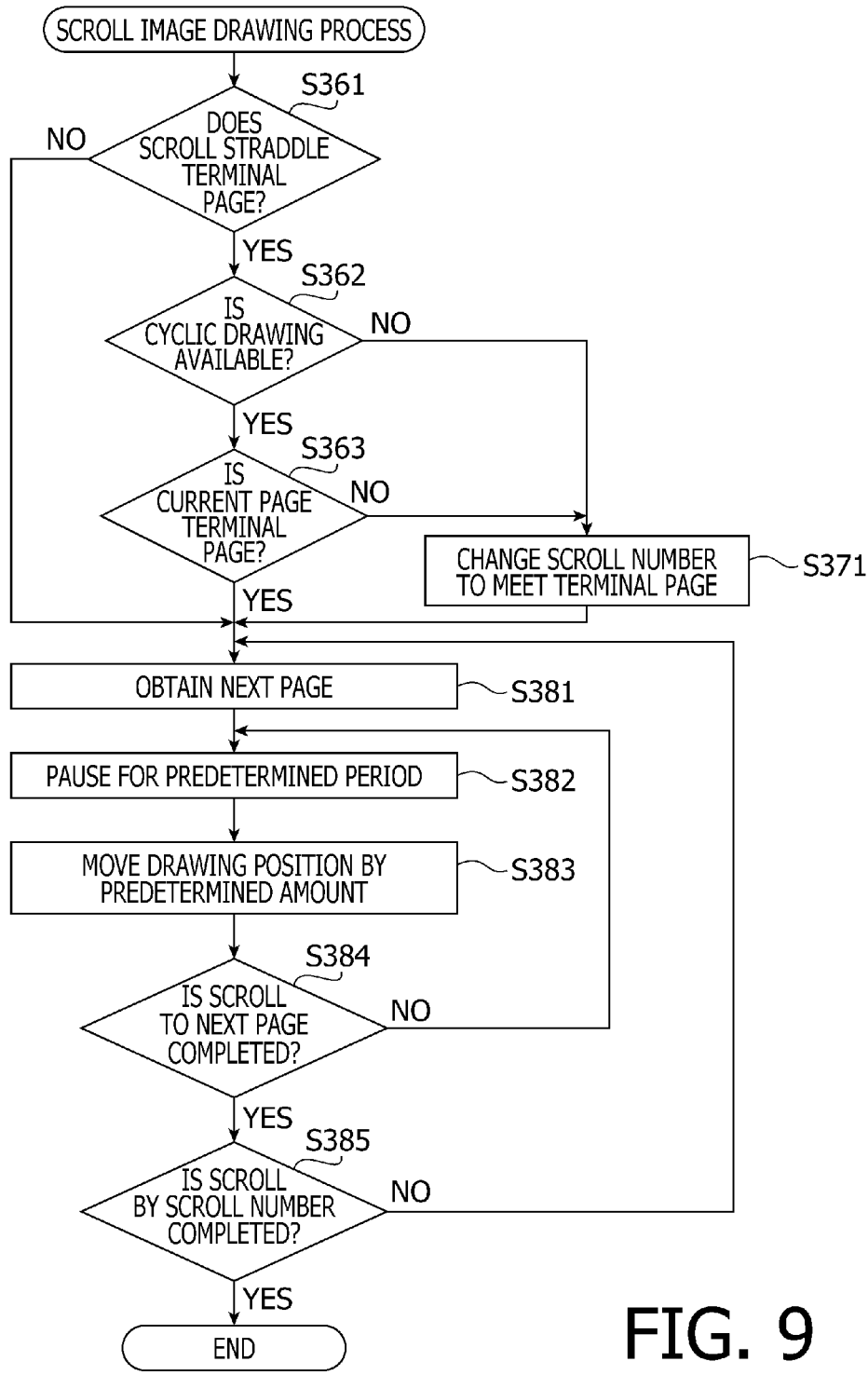
FIG. 9 is a flowchart illustrating a scroll process executed by the MFP according to the illustrative embodiment.
Figure 10:
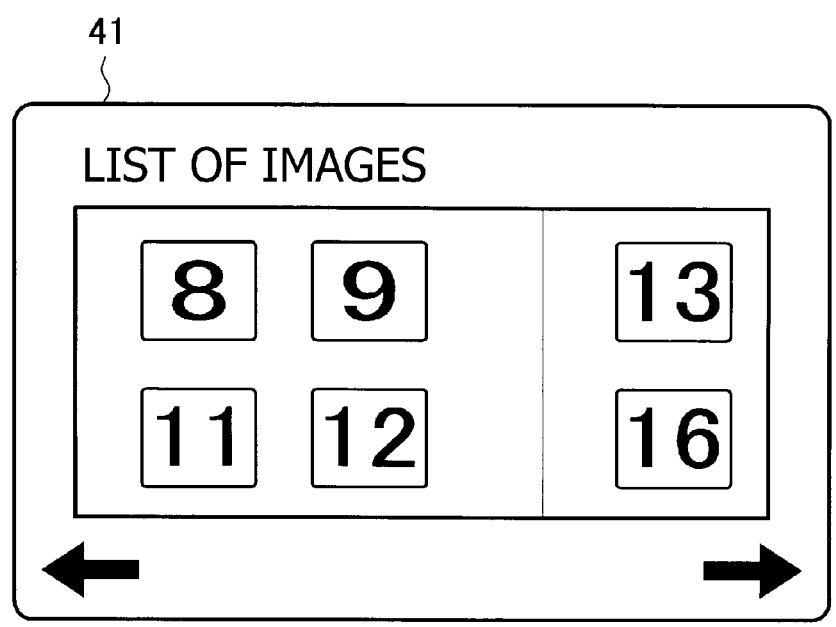
FIG. 10 is an exemplary display when switching of the pages are being executed.

The scroll image drawing process will be described referring to the flowchart shown in FIG. 9. When the scroll image drawing process is launched, the CPU 31 determines whether scrolling the pages in accordance with the determined scroll number will pass over a terminal page (i.e., the first page or the last page of the plurality of pages) (S361). When the terminal page is passed over (S361: YES), the CPU 31 determines whether the cyclic drawing is allowed to be applied to the screen (S362). When the cyclic drawing should not be performed (S362: NO), in order to avoid the cyclic drawing, the CPU 31 changes the scroll number to a value such that the pages are advanced to the terminal page (S371).

When the cyclic drawing is allowed (S362: YES), the CPU 31 determines whether the currently displayed page is the terminal page (S363). When the currently displayed page is not the terminal page (S363: NO), the CPU 31 changes the scroll number so that the displayed page is changed to the terminal page (S371). If the terminal page is skipped by scrolling and the pages are advanced to a page following the other terminal page, the user may not recognize that the terminal page is passed over. Therefore, it is preferable that the terminal page is once displayed before the pages are further advanced. When the currently displayed page is the terminal page (S363: YES), it is preferable that the pages are scrolled in accordance with the cyclic drawing. Therefore, in this case, the scroll number is not changed.

After execution of S371, when the currently displayed page is the terminal page (S363: YES), or when the scrolling will not pass over the terminal page (S361: NO), the CPU 31 obtains the information regarding the next page in accordance with the moving direction of the touching position (S381). Then, after a pause for a predetermined period (S382), the image drawing positions are moved by a predetermined amount (S383). Thereafter, the CPU 31 determines whether scrolling to the next page has been completed (S384). When the scroll to the next page has not been completed (S384: NO), the CPU 31 proceeds to S382 to pause for the predetermined period, and the drawing positions are further moved by the predetermined amount. With this configuration, when a page of image is moved, the drawing positions are gradually changed as an animation. When the plurality of pages are switched, if a target page is displayed with skipping the intervening pages, the user may not recognize that the pages have been skipped. Therefore, according to the illustrative embodiment, the pages to be ultimately skipped are also displayed to move gradually before the target page is displayed.

When scrolling to the next page has been completed (S384: YES), the CPU 31 determines whether the pages corresponding to the scroll number have been scrolled (S385). When scrolling of the pages corresponding to the scroll number have not been completed (S385: NO), the CPU 31 proceeds to S381 and draws the further advanced page. When the pages corresponding to the scroll number have been moved (S385: YES), the scroll image drawing process is terminated.

In the scroll image drawing process (FIG. 9), when the terminal pages will be passed over, the target page is changed to the terminal page. A condition for changing the target page needs not be limited to the above condition. For example, if there is a page which is very important to be displayed, the CPU 31 may determine whether the important page will be skipped, and change the target page to the important page.

As describe above, according to the MFP 100, when the screen on the touch panel 41 is scrolled by the dragging or flicking of the user, the scroll number is changed depending on the moving amount of the touching position after the user touches the touch panel 41, or the moving amount of the input element in dragging. Specifically, when the moving amount in dragging or flicking is relatively small, the page is advanced to the next page, while the moving amount is relatively large, the pages are further advanced. With this configuration, the user can make the desired page be displayed earlier by controlling the movement of the input element. As a result, operability in scrolling the displayed pages can be improved.

Figure 11:
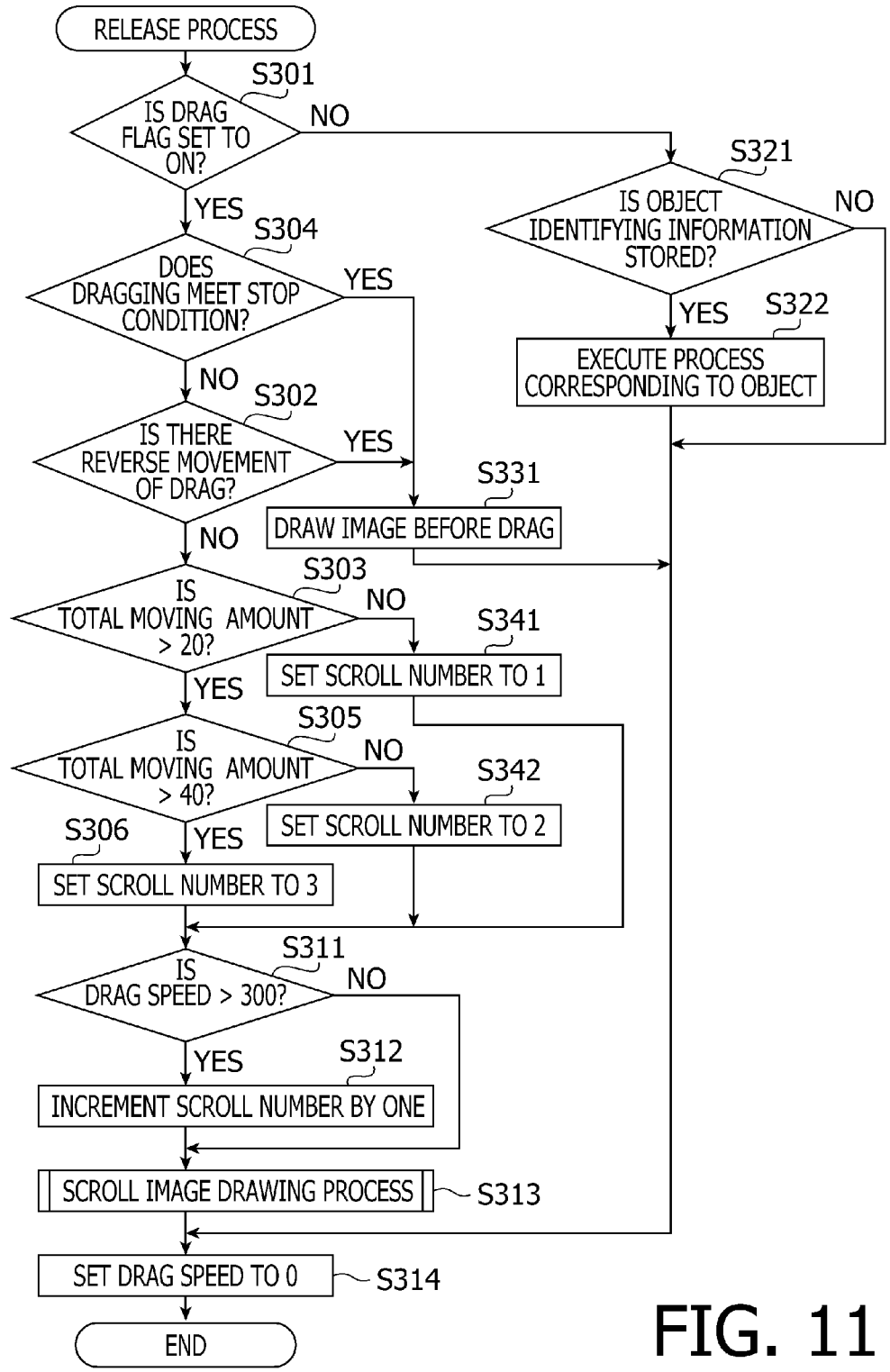
FIG. 11 is a flowchart illustrating a release process executed by the MFP according to another illustrative embodiment.

Next, an alternative release process according will be described, referring to FIG. 11. In the process shown in FIG. 8, the drag speed is slow, the scroll number is set to one. In contrast, according to the alternative release process shown in FIG. 11, when the drag speed is slow, the displayed image is returned to the previous state regardless of the total amount of the dragging movement. It is noted that, in FIG. 11, steps same as those in FIG. 8 are assigned with the same step number and description thereof will be omitted for brevity.

According to the alternative release process, when the drag flag is ON (S301: YES), the CPU 31 determines whether the stop condition of the dragging movement is satisfied (S304). When the stop condition is satisfied (S304: YES), the user may not wish to change the page to the next one. Therefore, according to the alternative release process, when the stop condition is satisfied, the displayed image is returned to the page before the dragging is started (S331).

When the stop condition of dragging is not satisfied (S304: NO), the CPU 31 determines whether there is a reverse movement of dragging (S302). When the reverse movement of dragging was not made (S302: NO), the CPU 31 proceeds to S303 and executes a process to determine the scroll number. In the process of determining the scroll number, according to the alternative embodiment, the CPU 31 does not determine whether the dragging speed is slow or not. Specifically, when the total moving amount of dragging is larger than 20 dots (S303: YES), the CPU 31 skips S304 and determines whether the total amount of dragging exceeds 20 dots (S303: YES), the CPU 31 does not executes S304 and determines whether the total moving amount exceeds 40 dots (S305). The following steps are similar to those in FIG. 8, and description thereof will be omitted for brevity.

Also in the alternative release process, the scroll number is changed in accordance with the total moving amount of dragging, the user make the desired page displayed earlier by adjusting the moving of the input element. Further, in the alternative release process, since the pages are not switched when the drag speed is relatively small, even if the total moving amount of dragging is relatively large, the user can easily cancel the switching of pages. In the release process shown in FIG. 8, when the drag speed is relatively slow, the scroll page number is set to one. Therefore, even if the total moving amount of dragging is relatively large, by setting the scroll page number to one, switching unnecessarily large number of pages can be suppressed.

It is noted that the above-described illustrative embodiments are only exemplary ones and the disclosures should not be limited to configurations of those embodiments. Various modifications and/or improvements could be made according to aspects of the disclosures. For example, the displaying device needs not be limited to ones provided to the operation unit of image processing apparatuses such as an MFP, but could be applied to the operation unit provided to a mobile terminal such as a smartphone, or processing devices other than the image processing devices.

The threshold value referred to in S304 to determine whether the drag speed is slow or not, the threshold value referred to in S303 or S305 to determine whether the total moving amount of dragging is large or not, and the threshold value referred to for determining the drag speed is slow or fast are only exemplary values and can be changed arbitrarily.

According to the above-described illustrative embodiments, scrolling of pages along an axis of abscissa of the coordinate is allowed, while scrolling of pages along an axis of ordinate of the coordinates is not allowed. This configuration may be modified such that scrolling of pages along an axis of ordinate of the coordinate is allowed, while scrolling of pages along an axis of abscissa of the coordinates may not be allowed. Alternatively, scrolling along both axes may be allowed.

According to the illustrative embodiment, the moving amount of dragging and the drag speed are calculated based on the previous coordinates and time, and the current coordinates and the time. The above configuration may be modified such that the moving amount of dragging and the drag speed are calculated based on the coordinate and time of the touch point and the coordinate and time of the current position. It is noted that, by using the latest coordinates and time, an irregular movement during the dragging movement can be detected and the control can be made in better accordance with the movement of the input element.

According to the illustrative embodiment, the number of scrolling pages is determined based on the amount and speed of the drag movement. This configuration can be modified such that the number of scrolling pages may be determined at least the amount of drag movement.

According to the illustrative embodiment, when a plurality of pages are scrolled, each page is displayed for a predetermined period until the target page is displayed. This configuration may be modified such that the intervening pages are skipped and the target page is directly displayed.

What is claimed is:
1. A displaying device, comprising:
a displaying unit;
a touch panel provided on the displaying unit and configured to detect a touch by an input element; and
a controller,
wherein the controller is configured to control the displaying device to:
display one of a plurality of pages of images on the display unit;
obtain a moving direction and a moving amount of the input element from a touch point to a release point, the touch point being a point at which a non-touched state where the touch panel does not detect touch of the input element is changed to a touched state where the touch panel detects touch of the input element, the release point being a point at which the touched state is changed to the non-touched state; and
scroll a currently displayed page in a direction same as the moving direction of the input element such that the currently displayed page is switched to a target page,
wherein, when the moving amount of the input element is less than a predetermined threshold amount, the target page is set to be a next page which is next to the currently displayed page on a side opposite to the moving direction of the input element,
wherein, when the moving amount of the input element is equal to or larger than the predetermined threshold amount, the target page is set to be a page further advanced from the next page on a side opposite to the moving direction of the input element, and
wherein the controller is configured to further control the displaying device to:
determine whether a terminal page, which is one of a first page and a last page of the plurality of pages, depending on the moving direction, is included between the next page and the target page, wherein, when the terminal page is included between the next page and the target page, the controller controls the displaying device to change the target page to the terminal page, and when the terminal page is not included between the next page and the target page, the controller controls the displaying device to sequentially display intervening pages on the displaying device before the target page is displayed.

2. The displaying device according to claim 1, wherein the controller is configured to further control the displaying device to:

obtain a current touching position of the input element periodically when the input element is touching the touch panel; and calculate a moving speed of the touching position of the input element based on a current touching position and a time when the controller detects the current touching position, and a past touching position and a time when the controller detected the past touching position, the input element having been touching the touch panel when moving from the past touching position to the current touching position, wherein, when the moving speed is faster than a predetermined reference speed, the target page is shifted to a page advanced from the target page which is set based on the obtained moving amount of the input element.

3. The displaying device according to claim 2, wherein the controller is configured to further control the displaying device to:

calculate the moving speed of the touching position of the input element based on the current touching position and the time when the controller detects the current touching position, and the past touching position which is the latest touching position, and a latest time when the controller detected the latest touching position, the input element having been touching the touch panel when moving from the latest touching position to the current touching position.

4. The displaying device according to claim 1, wherein the controller is configured to further control the displaying device to:

obtain a current touching position of the input element periodically when the input element is touching the touch panel;

calculate a moving speed of the touching position of the input element based on a current touching position and a time when the controller detects the current touching position, and a past touching position and a time when the controller detected the past touching position, the input element having been touching the touch panel when moving from the past touching position to the current touching position, wherein, when the moving amount is greater than a predetermined reference amount, the target page is set to be the next page when the obtained moving speed satisfies a stop condition, while the target page is set to a page advanced from the next page when the obtained moving speed does not satisfy the stop condition.

5. The displaying device according to claim 4, wherein the controller is configured to further control the displaying device to:

when the moving speed is faster than a predetermined reference speed, shift the target page to a page advanced from the current target page in the moving direction of the input element.

6. The displaying device according to claim 4, wherein the controller is configured to further control the displaying device to:

calculate the moving speed of the touching position of the input element based on the current touching position and the time when the controller detects the current touching position, and the past touching position, which is the latest touching position, and a latest time when the controller detected the latest touching position, the input element having been touching the touch panel when moving from the latest touching position to the current touching position.

7. The displaying device according to claim 1, wherein the controller is configured to further control the displaying device to:

after the target page is determined, determine whether a particular page having a particular attribution is included between the next page and the target page; and when the particular page is included between the next page and the target page, change the target page to the particular page.

8. The displaying device according to claim 7, wherein the particular page includes a page notifying an error condition.

9. The displaying device according to claim 7, wherein, when the input element is moved in a direction where the plurality of pages are to be scrolled in ascending order, and the moving amount of the input element is relatively large so that a plurality of pages are to be scrolled in the ascending order, the controller is configured to further control the displaying device to scroll the plurality of pages in the ascending order, wherein when the particular page is the last page, the controller controls the displaying device to display the last page, and wherein when scrolling continues in the ascending order as the last page is displayed, the controller treats the first page as the next page.

10. The displaying device according to claim 7, wherein, when the input element is moved in a direction where the plurality of pages are to be scrolled in descending order, and the moving amount of the input element is relatively large so that a plurality of pages are to be scrolled in the descending order, the controller is configured to further control the displaying device to scroll the plurality of pages in the descending order, wherein when the particular page is the first page, the controller controls the displaying device to display the first page, and wherein when scrolling continues in the descending order as the first page is displayed, the controller treats the last page as the next page.

11. The displaying device according to claim 1, wherein, when the plurality of pages are scrolled and a target page is ultimately displayed on the display unit, the controller controls the displaying device to sequentially display intervening pages on the displaying unit, each for a predetermined period, before the target page is displayed.

12. A non-transitory computer-readable recording medium storing instructions for a displaying device which has a displaying unit, a touch panel provided on the displaying unit and configured to detect a touch by an input element, and a controller, wherein the instructions, when executed by the controller, cause the displaying device to:

display one of a plurality of pages of images on the display unit;

obtain a moving direction and a moving amount of the input element from a touch point to a release point, the touch point being a point at which a non-touched state where the touch panel does not detect touch of the input element is changed to a touched state where the touch panel detects touch of the input element, the release point being a point at which the touched state is changed to the non-touched state;

scroll a currently displayed page in a direction same as the moving direction of the input element such that the currently displayed page is switched to a target page, wherein, when the moving amount of the input element is less than a predetermined threshold amount, the target page is set to be a next page which is next to the currently displayed page on a side opposite to the moving direction of the input element, wherein, when the moving amount of the input element is equal to or larger than the predetermined threshold amount, the target page is set to be a page advanced from the next page on a side opposite to the moving direction of the input element, wherein the instructions further cause the displaying device to:

determine whether a terminal page, which is one of a first page and a last page of the plurality of pages, depending on the moving direction, is included between the next page and the target page, wherein, when the terminal page is included between the next page and the target page, the instructions cause the displaying device to change the target page to the terminal page, and when the terminal page is not included between the next page and the target page, the instructions cause the displaying device to sequentially display intervening pages on the displaying device before the target page is displayed.

13. The non-transitory computer-readable recording medium according to claim 12, wherein the instructions further cause the displaying device to:

obtain a current touching position of the input element periodically when the input element is touching the touch panel; and calculate a moving speed of the touching position of the input element based on a current touching position and a time when the controller detects the current touching position, and a past touching position and a time when the controller detected the past touching position, the input element having been touching the touch panel when moving from the past touching position to the current touching position, wherein, when the moving speed is faster than a predetermined reference speed, the target page is shifted to a page advanced from the target page which is set based on the obtained moving amount of the input element.

14. The non-transitory computer-readable recording medium according to claim 12, wherein the instructions further cause the displaying device to:

obtain a current touching position of the input element periodically when the input element is touching the touch panel; and calculate a moving speed of the touching position of the input element based on a current touching position and a time when the controller detects the current touching position, and a past touching position and a time when the controller detected the past touching position, the input element having been touching the touch panel when moving from the past touching position to the current touching position, wherein, when the moving amount is greater than a predetermined reference amount, the target page is set to be the next page when the obtained moving speed satisfies a stop condition, while the target page is set to be a page advanced from the next page when the obtained moving speed does not satisfy the stop condition.

15. The non-transitory computer-readable recording medium according to claim 14, wherein the instructions further cause the displaying device to:

when the moving speed is faster than the predetermined reference speed, shift the target page to a page advanced from the current target page in the moving direction of the input element.

16. The non-transitory computer-readable recording medium according to claim 12, wherein the instructions further cause the displaying device to:

after the target page is determined, determine whether a particular page having a particular attribution is included between the next page and the target page; and when the particular page is included between the next page and the target page, change the target page to target page the particular page.

17. The non-transitory computer-readable recording medium according to claim 16, wherein, when the input element is moved in a direction where the plurality of pages are to be scrolled in ascending order, and the moving amount of the input element is relatively large so that a plurality of pages are to be scrolled in the ascending order, the instructions further cause the displaying device to scroll the plurality of pages in the ascending order, wherein when the particular page is the last page, the controller controls the displaying device to display the last page, and wherein when scrolling continues in the ascending order as the last page is displayed, the controller treats the first page as the next page.

18. The non-transitory computer-readable recording medium according to claim 16, wherein, when the input element is moved in a direction where the plurality of pages are to be scrolled in descending order, and the moving amount of the input element is relatively large so that a plurality of pages are to be scrolled in the descending order, the instructions further cause the displaying device to scroll the plurality of pages in the descending order, wherein when the particular page is the first page, the controller controls the displaying device to display the first page, and wherein when scrolling continues in the descending order as the first page is displayed, the controller treats the last page as the next page.

* * * * *

UNITED STATES PATENT AND TRADEMARK OFFICE
CERTIFICATE OF CORRECTION

| | | |
|---|---|---|
| PATENT NO. | : 9,798,400 B2 | Page 1 of 1 |
| APPLICATION NO. | : 14/552657 | |
| DATED | : October 24, 2017 | |
| INVENTOR(S) | : Yutaka Urakawa | |

It is certified that error appears in the above-identified patent and that said Letters Patent is hereby corrected as shown below:

On the Title Page

<u>Title, Item (54) and in the Specification Column 1 Lines 1-4:</u>
Please change: "DISPLAYING DEVICE AND NON-TRANSITORY COMPUTER-READABLE RECORDING MEDIUM STORING INSTRUCTIONS" to -- DISPLAYING DEVICE AND NON-TRANSITORY COMPUTER-READABLE RECORDING MEDIUM STORING INSTRUCTIONS THEREFOR --

Signed and Sealed this
Twentieth Day of February, 2018

Andrei Iancu
*Director of the United States Patent and Trademark Office*